(12) United States Patent
Katsumi

(10) Patent No.: US 6,346,963 B1
(45) Date of Patent: Feb. 12, 2002

(54) MULTI-POINT VIDEO CONFERENCE SYSTEM

(75) Inventor: Teruo Katsumi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/525,467

(22) Filed: Mar. 15, 2000

(30) Foreign Application Priority Data

Mar. 17, 1999  (JP) .............................................. 11-072499

(51) Int. Cl.[7] ................................................ H04N 7/14
(52) U.S. Cl. ................................ 348/14.09; 348/14.08; 348/4.07
(58) Field of Search .......................... 348/14.01, 14.02, 348/14.03, 14.04, 14.05, 14.06, 14.07, 14.08, 14.09, 14.1; 370/260, 261; 709/204, 205; 345/330; H04N 7/14, 7/15

(56) References Cited

FOREIGN PATENT DOCUMENTS

| JP | 402194787 A | * | 8/1990 | ............ | H04N/7/15 |
|---|---|---|---|---|---|
| JP | 4-40790 | | 2/1992 | | |
| JP | 5-103324 | | 4/1993 | | |
| JP | 5-207456 | | 8/1993 | | |
| JP | 6-86275 | | 3/1994 | | |
| JP | 7-245753 | | 9/1995 | | |
| JP | 8-149440 | | 6/1996 | | |

* cited by examiner

*Primary Examiner*—Curtis Kuntz
*Assistant Examiner*—Melur Ramakrishnaiah
(74) *Attorney, Agent, or Firm*—Young & Thompson

(57) ABSTRACT

A video signal from one of a plurality of conference terminals, whose speech time is the longest, is simultaneously displayed on the plurality of respective conference terminals as a single picture when the longest speech time exceeds the threshold value and video signals from the plurality of conference terminals are simultaneously displayed on the plurality of respective conference terminals as a synthesized picture when the longest speech time is shorter than the threshold value.

7 Claims, 5 Drawing Sheets

MULTI-POINT VIDEO CONFERENCE SYSTEM

CROSS REFERENCE TO RELATED APPLICATION

The present invention claims priority from Japanese Patent Application No. 11-72499 filed Mar. 17, 1999, the contents of which are incorporated herein by reference.

BACKGROUND OF THE INVENTION

1. Field of the Invention

The present invention relates to an equipment for use in an electronic conference through a communication circuit and, particularly, to a display switching technique for an image information for performing an electronic conference.

2. Description of the Related Art

In a multi-point video conference system for performing an electronic conference through a communication circuit, a conference terminal is provided in each of locations in which participants of a conference come together and a plurality of such conference terminals are connected to a multi-point control unit (MCU) provided on a center of the conference through the communication circuit. Each conference terminal collects an image information and audio information in a location in which the conference terminal is provided and transfers these information to the MCU. In the MCU, the image information and the audio information are synthesized and the synthesized information is distributed to the respective conference terminals. In each conference terminal, the image information from the MCU is displayed on a display device provided in the conference terminal and the audio information is outputted through a loudspeaker also provided in the conference terminal.

As prior arts related to such multi-point video conference system, Japanese Patent Application Laid-open Nos. H7-245753 and H6-86275 disclose techniques for selectively displaying one of a synthesized picture and a single picture. Further, Japanese Patent Application Laid-open Nos. H4-40790, H8-14944 and H5-103324 disclose techniques for changing a construction of a synthesized picture by a current speaker of a conference. Japanese Patent Application Laid-open No. H5-207456 discloses a technique for displaying statistics of the number of speeches.

However, there are problems in the conventional multi-point conference system, which will be described below.

A first problem of them is that, since, in order to switch a picture display between a synthesized picture and a single picture, a picture display condition selecting operation is required on the side of the conference terminal, it is impossible to adaptively control the picture display by the MCU correspondingly to a current situation of the conference. A second problem is that, since the picture display condition is determined by a current speaker even in a case where the picture display condition is to be changed according to a content of current speech, it is impossible to control the picture display condition correspondingly to a content of proceedings (report or discussion).

SUMMARY OF THE INVENTION

The present invention was made in view of the above mentioned state of the art and has an object to provide a multi-point video conference system in which it is possible to automatically control a picture display condition between a single picture display and a synthesized picture display adaptively to a content of proceedings of a conference without requiring an operation by a chairman or an operator of the conference.

Another object of the present invention is to provide a multi-point video conference system capable of constituting a picture display optimal to a situation of proceedings of a conference.

In a multi-point video conference system including a plurality of conference terminals each provided in a different one of a plurality of locations, particularly, a multi-point video conference system utilizing a multi-point control unit (MCU) having a picture synthesizing function, the present invention is featured by that a switching of picture display between a single picture and a synthesized picture can be automatically performed suitably according to a situation of proceedings, such as a situation in which a report is performed from one of the conference terminals or a discussion is performed between conference terminals, without requiring any operation of a chairman or an operator of the conference.

That is, in a multi-point video conference system including a plurality of conference terminals and a distribution unit for distributing video signals and audio signals outputted from the conference terminals to the respective conference terminals, the present invention is featured by that the distribution unit comprises a measuring unit for measuring speech times of the respective conference terminals, a selector unit for selecting one of the conference terminals, the speech time of which is the longest, according to a result of measurement by the measuring unit, a determination unit for determining whether or not the longest speech time of the conference terminal selected by the selector unit exceeds a suitable threshold value, and a display unit for displaying an video signal from the conference terminal having the longest speech time on display devices of the respective conference terminals simultaneously as a single picture when the longest speech time exceeds the threshold value and displaying video signals from the respective conference terminals on the display devices of the conference terminals simultaneously as a synthesized picture when the longest speech time is shorter than the threshold value.

With this construction of the multi-point video conference system, it is possible to automatically switch the picture display between a single picture and a synthesized picture, which is suitable for a situation of proceedings of the conference, without necessity of operation of a chairman or an operator of the conference.

Alternatively, the distributor unit may comprise a measuring unit for measuring speech times of the respective conference terminals, a permutation producing unit for producing a permutation of the conference terminals according to a length order of speech times measured by the measuring unit starting from the conference terminal having the longest speech time, a detector unit for detecting conference terminals having speech times exceeding a threshold value according to the conference terminal permutation produced by the permutation producing unit and a simultaneous display unit for displaying video signals from the respective conference terminals detected by the detector unit on display devices of the conference terminals simultaneously as a synthesized picture.

With this construction of the multi-point video conference system, it is possible to switch the picture display on the respective conference terminals between the single picture and the synthesized picture and, in the case of the synthesized picture, to select the conference terminal having long speech time and display the synthesized picture on the display devices thereof.

The simultaneous display unit may comprise means for simultaneously displaying video signals of all of the conference terminals on the respective conference terminals as the synthesized picture when the speech times of all of the conference terminals do not exceed the threshold value.

In a case where the number of the conference terminals is too large to display the video signals from all of the conference terminals simultaneously as a synthesized picture, the simultaneous display unit may further comprise a display unit for displaying video signals from a plurality (m) of conference terminals, which are selected in the length sequence of speech time according to the conference terminal permutation, on the display devices of the conference terminals simultaneously as a synthesized picture, where m is equal to or smaller than the total number of the conference terminals.

The simultaneous display unit may comprise a pattern selector for selecting one of a plurality of display patterns in response to an input operation of the one display pattern. With such construction, it is possible to display a picture suitable for a situation of the proceedings of the conference, in addition to the automatic switching of the picture according to the speech time.

BRIEF DESCRIPTION OF THE DRAWINGS

The above mentioned and other objects, features and advantages of the present invention will become more apparent by reference to the following detailed description of the invention taken in conjunction with the accompanying drawings, in which.

DETAILED DESCRIPTION OF THE PREFERRED EMBODIMENTS

Figure 1:
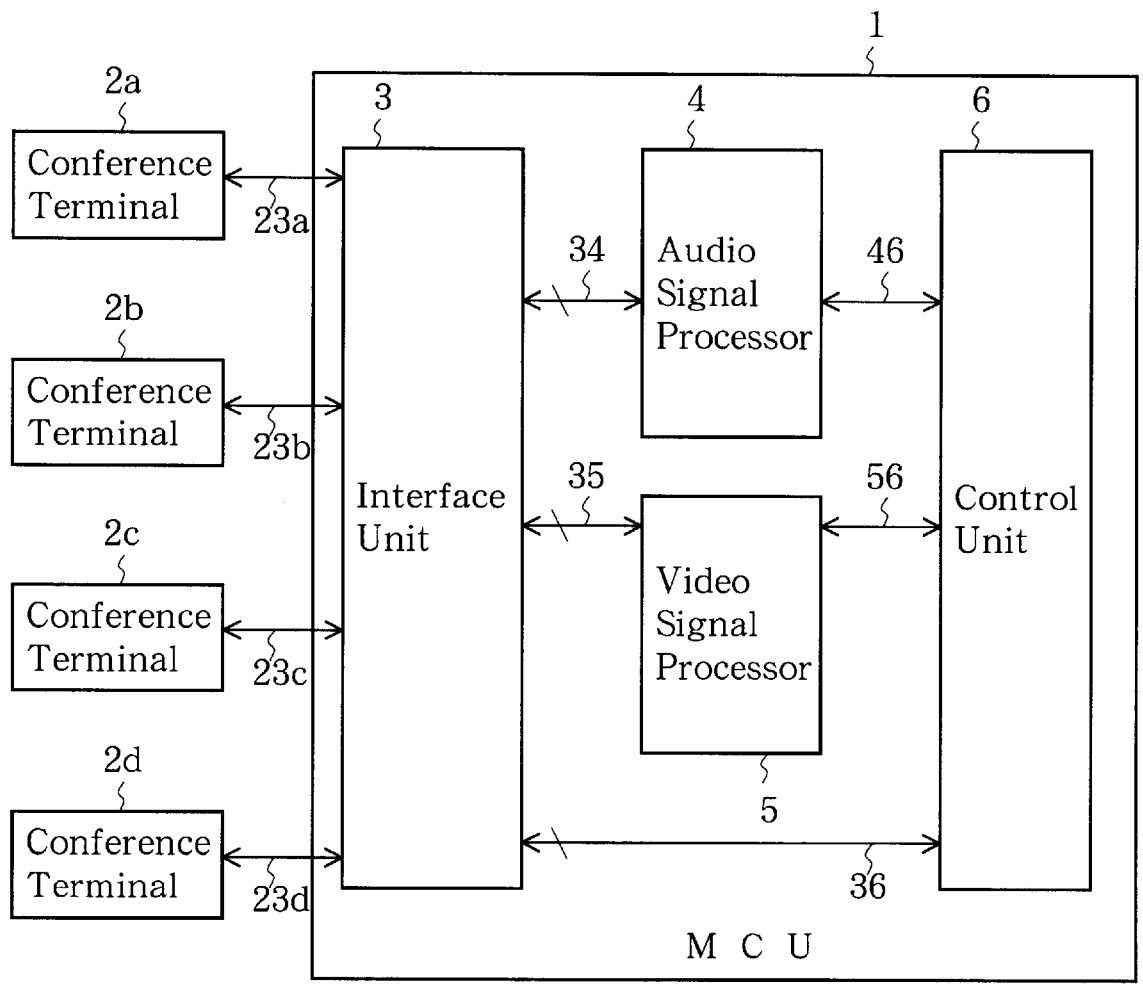
FIG. 1 is a block diagram showing a basic construction of a multi-point video conference system according to an embodiment of the present invention.

A multi-point video conference system shown in FIG. 1 includes MCU 1 and a plurality of conference terminals 2a to 2d connected to MCU 1 through bi-directional communication lines 23a to 23d, respectively. Conference terminals 2a to 2d transmit video signals obtained by video cameras provided in the respective conference terminals and audio signals obtained by microphones provided therein to MCU 1. As occasion demands, conference terminals 2a to 2d may transmit document data and control data, etc., to MCU 1. MCU 1 performs processing of the video signals and the audio signals, etc., from conference terminals 2a to 2d, such as synthesizing or switching of the video signals and mixing of the audio signals, and distributes the thus processed audio and video signals to respective conference terminals 2a to 2d in such a way that a picture or pictures and sounds from the conference terminals in the different locations can be watched simultaneously and heard simultaneously by conference terminals 2a to 2d. In conference terminals 2a to 2d, the synthesized pictures at the respective locations are displayed on display units thereof and the mixed sounds are outputted through loudspeakers thereof. Since each display unit can display pictures of the conference terminals in different locations dividually, participants of the conference can see the pictures at various locations simultaneously. Further the participants can hear speeches at various locations simultaneously.

MCU 1 includes interface unit 3, audio signal processor 4, video signal processor 5 and control unit 6. Interface unit 3 converts transmission signals received from conference terminals 2a to 2d through communication lines 23a to 23d into video signals and audio signals, transmits the audio signals to the audio signal processor 4 through bi-directional line 34 and the video signal to video signal processor 5 through bi-directional line 35. Further, MCU 1 converts the audio signals received through line 34 and the video signals received through line 35 into a transmission signal and transmits the transmission signal to conference terminals 2a to 2d through communication lines 23a to 23d. Audio signal processor 4 decodes the audio signals received through line 34, synthesizes them, codes the synthesized audio signal and transmits the coded signal to interface unit 3 through line 34. Simultaneously therewith, audio signal processor 4 detects speech conditions in the conference terminals in the respective locations from the audio signals received through line 34 and transmits the speech conditions to control unit 6 through line 46 as a speech detection information. Video signal processor 5 switches and/or synthesizes the video signals received through line 35 according to a picture control information received from control unit 6 through line 56 and transmits a resultant video signal to interface unit 3 through line 35. Control unit 6 transmits a control information of the picture switching and/or the picture synthesizing through line 56 as the picture control information by using the speech detection information received from audio signal processor 4 through line 46.

Figure 2:
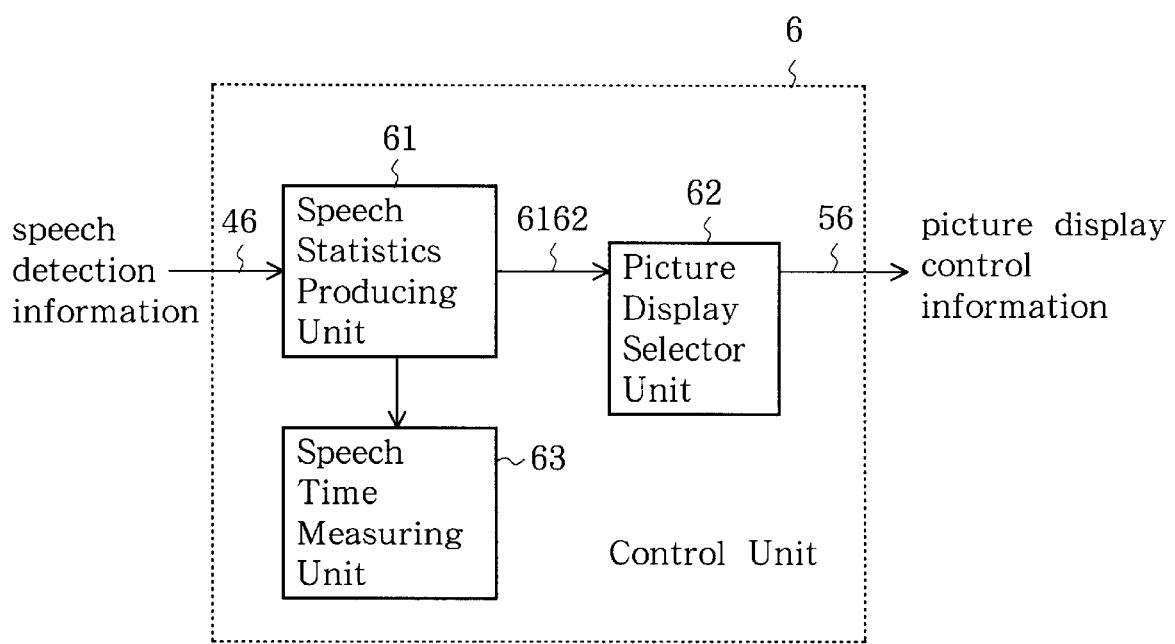
FIG. 2 is a block diagram showing an embodiment of a control unit of the multi-point video conference system shown in FIG. 1.

FIG. 2 is a block circuit diagram of an example of control unit 6. As shown in FIG. 2, control unit 6 includes time measuring unit 63 for measuring speech times of respective conference terminals 2a to 2d, speech statistics unit 61 for selecting one (2i) of conference terminals 2a to 2d, a speech time of which is the longest, according to a result of the measurement in time measuring unit 63 and picture display selector 62 for determining whether or not the speech time of selected conference terminal 2i exceeds a threshold value and displaying an video signal of conference terminal 2i on the display devices of all of the conference terminals simultaneously as a single picture when the longest speech time exceeds the threshold value or video signals of respective conference terminals 2a to 2d on the display devices thereof simultaneously as a synthesized picture when the longest speech time is shorter than the threshold value.

Speech statistics unit 61, when receives the speech detection information containing the speech information of the respective locations through line 46, collects the statistics of the speech times within a constant time period for every location by utilizing the speech detection information and outputs a resultant information to picture display selector 62 through line 6162 as a speech statistics information. Time measuring unit 63 supplies a timing signal to be used in speech statistics unit 61 to produce the speech statistics information. Picture display selector 62 determines the picture display condition by utilizing the speech statistics information received through line 6162 and outputs it to video signal processor 5 through line 56 as a picture control information. The determination of the picture display condition is performed by comparing speech times at the respective locations on the basis of the speech statistics information, comparing the speech time of a location K, the speech time in which is the longest, with a suitably determined threshold value and transmitting a picture of the location K to the other locations as a single picture when the speech time is longer than the threshold value. With such scheme, the participants can pay attention to a speaker at the location K in the conference. When the speech is shorter than the threshold value, pictures at the respective locations are synthesized and transmitted to the respective locations as a synthesized picture, so that the participants can get hold of a state of the whole conference at a glance.

The determining procedure of the picture display condition to be performed by picture display selector 62 will be described in detail with reference to a flowchart shown in FIG. 3. Further, the processing to be performed by video signal processor 5 according to the picture display condition determined by picture display selector 62 will be described in detail.

In picture display selector 62, the location K, the speech time at which is the longest, and the speech time L(K) thereof are obtained from the speech statistics information (step A1). Then, the speech time L(K) obtained in the step A1 is compared with a suitably determined threshold value M (step A2). When the speech time L(K) is larger than the threshold value M (YES in the step A2), the picture display condition is set to a single picture display (step A3) and, when the speech time L(K) is equal to or smaller than the threshold value M (NO in the step A2), the picture display condition is set to a synthesized picture display (step A4). Picture display selector 62 determines the picture display condition in this manner and produces the display control information on the basis of the thus set picture display condition. Picture display selector 62 transmits the display control information to line 56 (step A5).

In response to the display control information received from line 56, video signal processor 5 performs a picture display constructing processing including picture synthesizing processing and picture switching processing, which is to be transmitted to the respective locations. That is, when the synthesized picture display is selected by picture display selector 62, the pictures at the respective locations are synthesized and the synthesized picture is transmitted to the respective locations. On the other hand, when the single picture display is selected by picture display selector 62, the picture at a location, the speech time at which is the longest, is transmitted to the locations other than the location having the longest speech time as a single picture. In this case, a picture to be transmitted to the location having the longest speech time may be a synthesized picture obtained by synthesizing pictures of the other locations or a single picture of any other location.

Since the picture display condition is automatically determined on the basis of the speech times in the respective locations in this manner, it becomes possible to control the picture display, without necessity of any operation by a chairman or an operator of a conference, such that, in a case where a speech such as report or explanation of research materials is performed by a speaker in a single location, a single picture is displayed on the display devices of the respective locations simultaneously so that the participants can pay attention to the speaker or, in a case such as a discussion where there are random speeches in respective locations, pictures of the respective locations having speeches are synthesized and displayed in the respective locations simultaneously so that the participants can get hold of a state of the conference at a glance. That is, it is possible to realize the control of the picture display condition correspondingly to the state of conference, without any complicated operation by the chairman or the operator.

Figure 3:
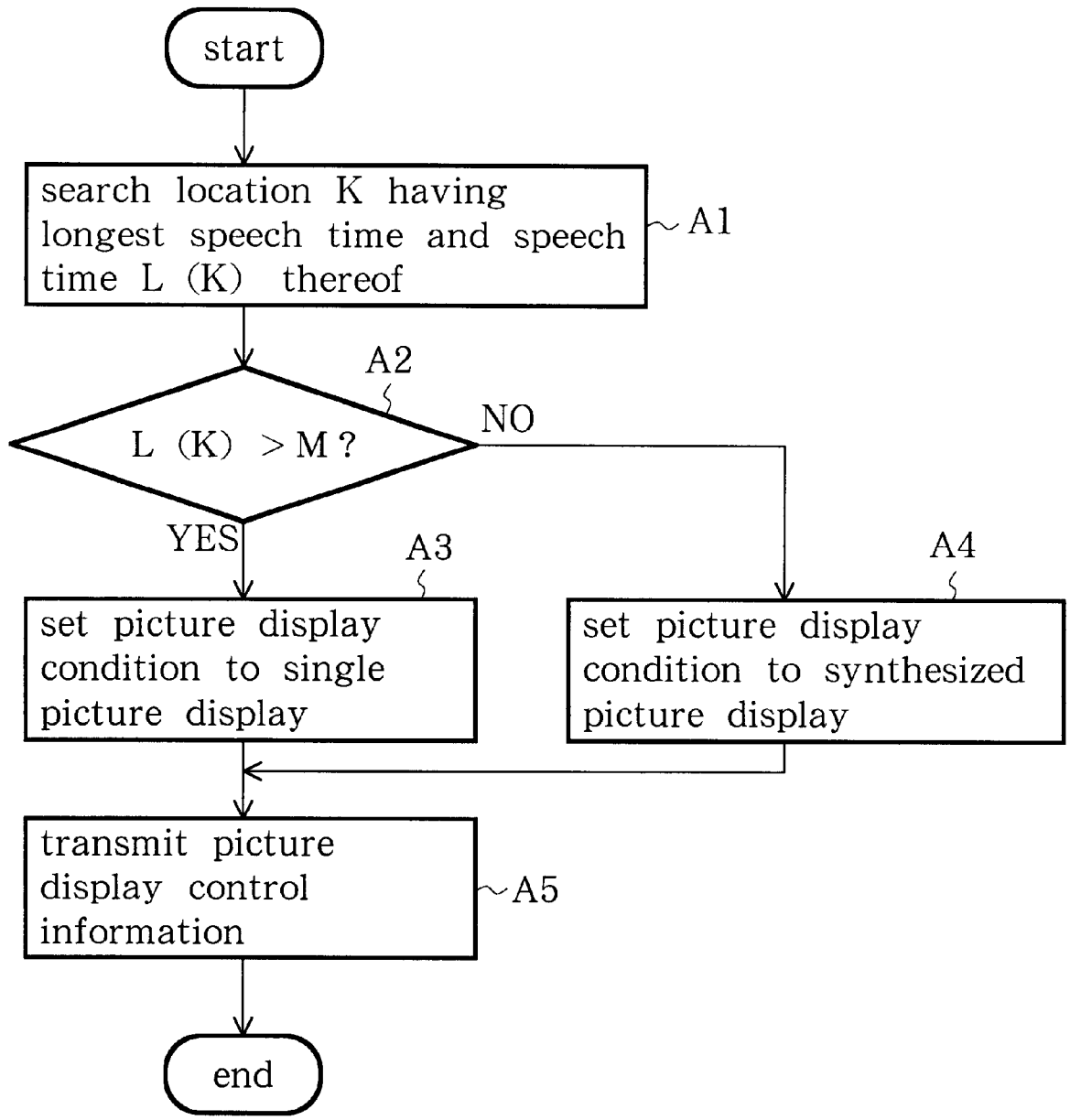
FIG. 3 is a flowchart showing an example of procedure for determining a state of a picture display.
Figure 4:
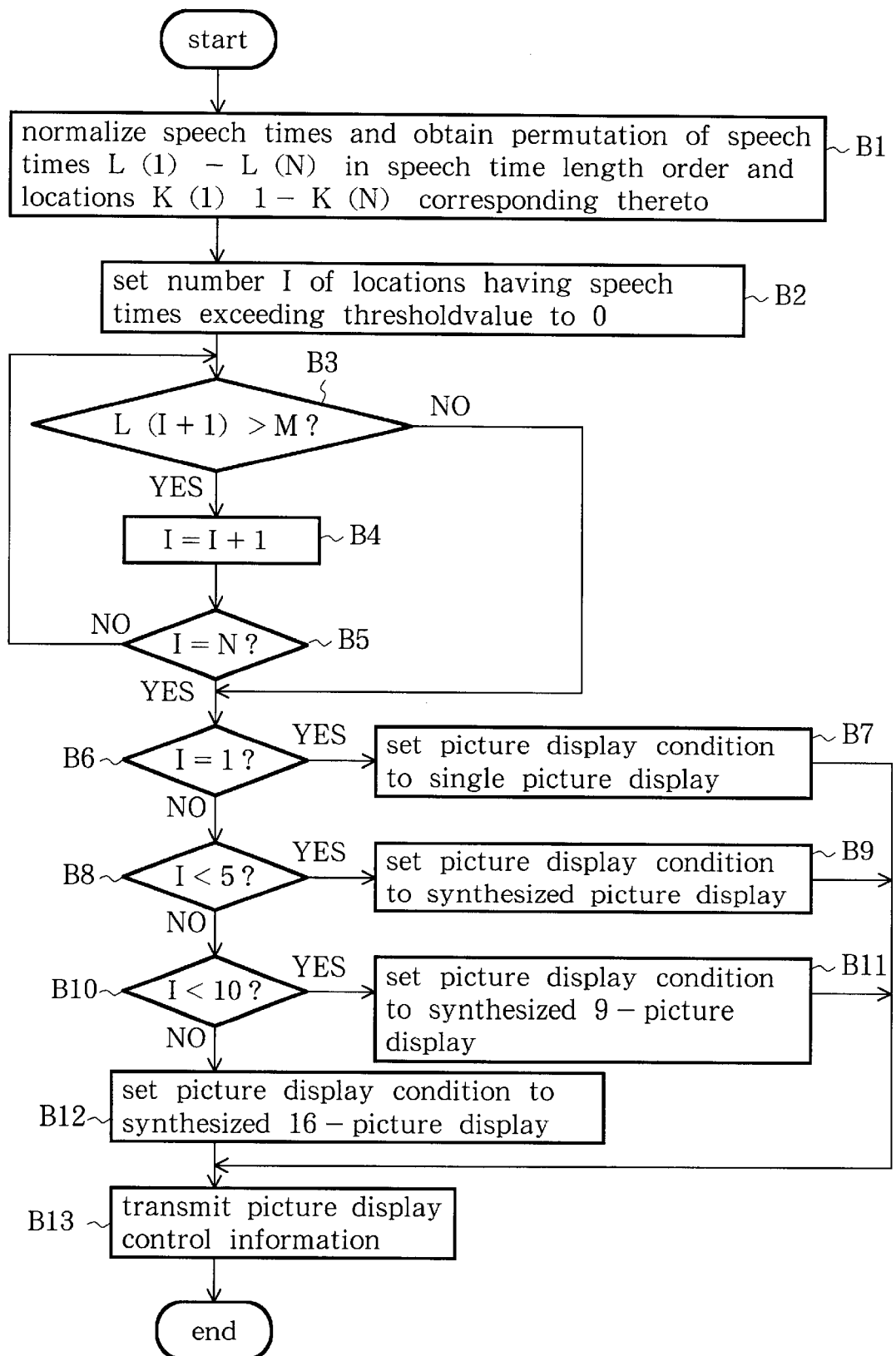
FIG. 4 is a flowchart showing another example of the procedure for determining a state of a picture display.

FIG. 4 shows another example of the determining procedure of the picture display condition to be performed by picture display selector 62. Contrary to the procedure shown in FIG. 3, in which, when the speech time of the location having the longest speech time exceeds the threshold value, the picture of that location is displayed on the display devices of other locations simultaneously as a single picture, a permutation of conference terminals in a length order starting from a conference terminal having longest speech time is produced in the procedure shown in FIG. 4. Conference terminals having speech times exceeding a threshold value are detected according to the conference terminal permutation and pictures of the detected conference terminals are synthesized and displayed on display devices of the respective conference terminals simultaneously. In a case where speech time of none of the respective conference terminals exceeds the threshold value, pictures of all of the conference terminals are synthesized and displayed on the display devices of all of the conference terminals simultaneously. In a case where the total number of the conference terminals is too large to display the video signals from all of the conference terminals simultaneously as a synthesized picture, video signals from a plurality (m) of conference terminals in the length sequence of speech time according to the permutation on the conference terminals simultaneously as a synthesized picture, where m is equal to or smaller than the total number of the conference terminals.

That is, picture display selector 62 normalizes speech times on the basis of the speech statistics information by converting speech times into relative values with the longest speech time being 1 and speech times L(1) to L(N) in the length sequence and locations K(1) to K(N) corresponding thereto are obtained, where N is the number of locations connected to the conference, (step B1). Then, the number (I) of speech times among the speech times L(1) to L(K), which exceed the suitably determined threshold value M, are obtained (steps B2 to B5). When I is 1 (YES in the step B6), the picture display condition is set to the single picture display (step B7). When I is 2 to 4 (YES in the step B6), the picture display condition is set to a synthesized four-picture display (step B9). In the latter case, it is possible to select the locations K(1) to K(4) in the speech time length sequence as locations whose video signals are to be synthesized. Similarly, the picture display conditions are determined correspondingly to the value I (steps B10 to B12), the picture display control information is constructed by the thus determined picture display conditions and transmitted to circuit 56 (step B13).

In this embodiment, the number of pictures to be synthesized is 4, 9 or 16. However, in a case where other picture synthesizing patterns is employed or the picture synthesizing pattern is limited up to, for example, four pictures, the steps B6 to B12 may be modified suitably.

As described, since, in the procedures shown in FIG. 4, the picture display condition is determined on the basis of the relative values of speech time, it is possible to obtain, in addition the effect obtained by the procedure shown in FIG. 3, an effect of displaying a picture of a specific location on the display devices of other locations simultaneously as a single picture in a case where the number of speeches of the specific location is relatively large even when the speech frequency of the proceedings as a whole is low, contrary to the embodiment shown in FIG. 3 in which a synthesized picture is displayed. On the contrary, in a case where a plurality of locations have speeches of similar lengths, when the speech frequency of the proceedings as a whole is high, it is possible to select a synthesized picture display with which the state of the whole conference can be confirmed at a glance, contrary to the embodiment shown in FIG. 3 in which a single picture is displayed on the display devices of the other locations.

In this invention, the picture display condition is determined on the basis of relative values of the speech times by normalizing the speech times. However, it is possible to determine the display condition by combining absolute values of speech times. That is, when the maximum value of speech time is smaller than a suitably determined threshold value L, that is, when the speech frequency of the whole conference is low, the display condition is set to the synthesized picture and a location to be displayed is determined by a relative value of speech time. When the maximum value of speech time is larger than the threshold value L, the procedure shown in FIG. 4 is used as it is.

Figure 5:
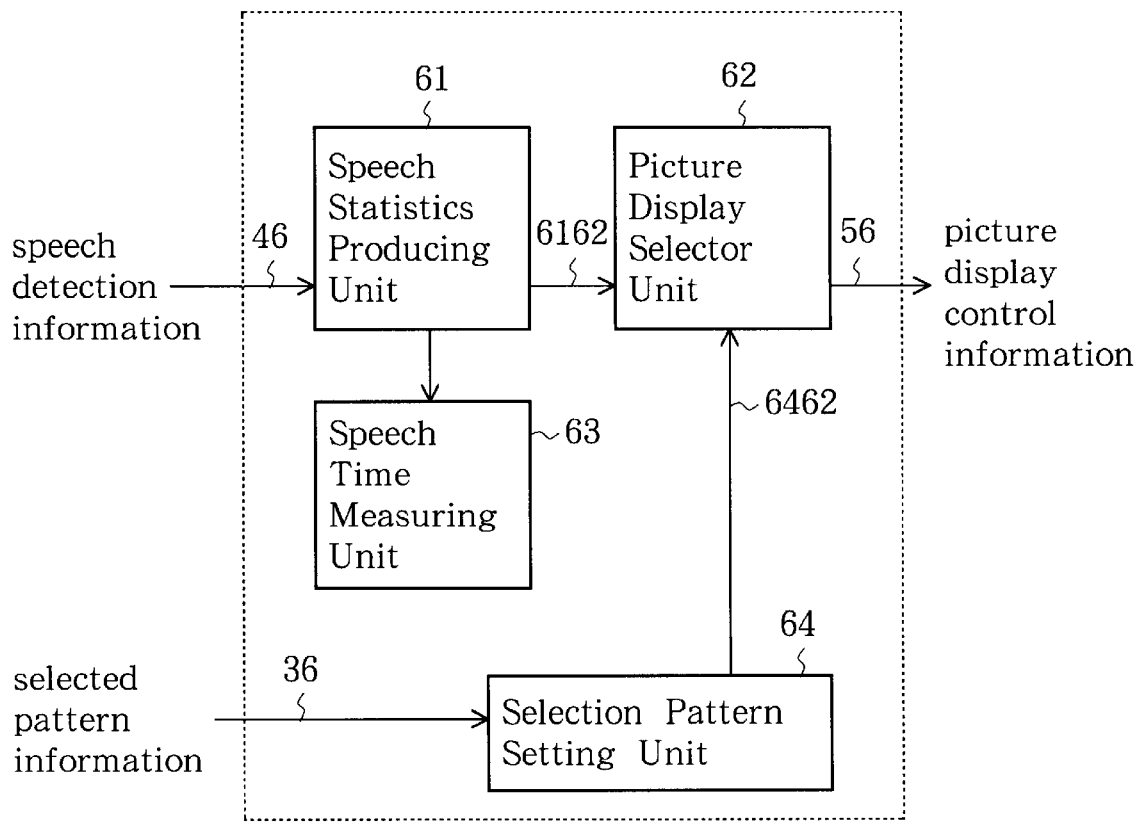
FIG. 5 is a block diagram showing another example of the control unit shown in FIG. 1.

FIG. 5 shows another example of the control unit. In this example, it is possible to select a picture display procedure from a certain number of patterns by a setting console connected to the conference terminals at the respective locations or to the MCU and the selected pattern is input to control unit 6 from line 36 as a selected pattern information. Control unit 6 includes selection pattern setting unit 64 and, on the basis of the selection pattern information from line 36, selection pattern setting unit 64 sets the picture display selection procedure to be executed by picture display selection unit 62 through line 6462. Since the procedure for determining the picture display condition can be selected by the conference terminal or the control console on the basis of the speech times, it is possible to utilize a display state determining procedure concomitant with nature of the proceedings such as speech frequency to thereby control the display construction suitable for the conference condition.

Although, in the above description, the number of locations participating in the conference is four, the present invention can be similarly applied to a case where the number of the participating location exceeds four or is smaller than three.

As described hereinbefore, according to the present invention, it is possible to automatically control a condition of a single picture display or a synthesized picture display, which is suitable to a form of proceedings in the conference, without necessity of operation of a chairman or an operator of the conference to thereby construct a picture display optimal to the form of the conference. Therefore, it is possible to control the picture display correspondingly to the form of proceedings without owing any complicated operation to the chairman or the operator. Further, by displaying a single picture when the speech times are long or a synthesized picture when the speech times are short, participants can pay attention to a speaker when the speech is such as announcement, explanation of materials or report, which is one-directional from a single location, and the state of the conference can be confirmed on the synthesize picture in a case of a discussion in which there are many speeches from respective locations.

What is claimed is:

1. A multi-point video conference system comprising: a plurality of conference terminals; and distribution means connected to the plurality of said conference terminals for distributing video signals and audio signals outputted from said respective conference terminals to the plurality of said conference terminals, said distribution means comprising: measuring means for measuring speech times of the plurality of said conference terminals, respectively; selection means for selecting one of the plurality of said conference terminals, whose speech time is the longest, according to a result of the speech time measurement in said measuring means; judgement means for determining whether or not the longest speech time of said conference terminal selected by said selection means exceeds a threshold value; and simultaneous display means for simultaneously displaying a video signal from said one conference terminal on the plurality of said conference terminals as a single picture when the longest speech time exceeds the threshold value or simultaneously displaying video signals from the plurality of said conference terminals on the plurality of said conference terminals as a synthesized picture when the longest speech time is shorter than the threshold value.

2. A multi-point video conference system as claimed in claim 1, wherein said simultaneous display means is provided with a plurality of display patterns and further comprising selector means for selecting one of the display patterns according to an input operation thereof.

3. A multi-point video conference system comprising:

a plurality of conference terminals; and distribution means connected to the plurality of said conference terminals for distributing video signals and audio signals outputted from said respective conference terminals to the plurality of said conference terminals, said distribution means comprising:

measuring means for measuring speech times of the plurality of said conference terminals, respectively;

means for producing a sequence of the plurality of said conference terminals according to a length order of speech time of said conference terminals, starting from one of said conference terminals whose speech time is the longest;

detection means for detecting identity of and total number of conference terminals of the plurality of said conference terminals whose speech times exceed a threshold value; and simultaneous display means for simultaneously displaying video signals from the detected conference terminals as a synthesized picture on each of the plurality of said conference terminals if the total number of detected conference terminals is at least 1.

4. A multi-port video conference system as claimed in claim 3, wherein said simultaneous display means comprises means for simultaneously displaying video signals of all of the plurality of said conference terminals as a synthesized picture on each of the plurality of said conference terminals if the total number of the detected conference terminals is zero.

5. A multi-point video conference system as claimed in claim 3, wherein said simultaneous display means comprises means for simultaneously displaying video signals of m said conference terminals as a synthesized picture on each of the plurality of said conference terminals if the total number of the detected conference terminals is zero, wherein said m conference terminals are selected in the length order of speech time starting from the longest speech time, wherein m is equal to or smaller than the number of the plurality of said conference terminals.

6. A multi-point video conference system as claimed in claim 3, wherein said simultaneous display means is provided with a plurality of display patterns and further comprising selector means for selecting one of the display patterns according to an input operation thereof.

7. The multi-point video conference system of claim 5, wherein m is less than the number of the plurality of said conference terminals.

* * * * *